(12) United States Patent
Mahajan et al.

(10) Patent No.: US 12,136,286 B2
(45) Date of Patent: Nov. 5, 2024

(54) METHOD AND SYSTEM FOR KEYPOINT EXTRACTION FROM IMAGES OF DOCUMENTS

(71) Applicant: Tata Consultancy Services Limited, Mumbai (IN)

(72) Inventors: Kushagra Mahajan, Gurgaon (IN); Monika Sharma, Gurgaon (IN); Lovekesh Vig, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 205 days.

(21) Appl. No.: 17/607,437

(22) PCT Filed: Sep. 6, 2020

(86) PCT No.: PCT/IN2020/050778
§ 371 (c)(1),
(2) Date: Oct. 29, 2021

(87) PCT Pub. No.: WO2021/044447
PCT Pub. Date: Mar. 11, 2021

(65) Prior Publication Data
US 2022/0215683 A1 Jul. 7, 2022

(30) Foreign Application Priority Data

Sep. 6, 2019 (IN) .............................. 201921035983

(51) Int. Cl.
*G06V 30/41* (2022.01)
*G06V 30/19* (2022.01)

(52) U.S. Cl.
CPC ........ *G06V 30/41* (2022.01); *G06V 30/19007* (2022.01)

(58) Field of Classification Search
CPC ............. G06V 30/41; G06V 30/19007; G06V 30/18143; G06V 30/412; G06V 30/418; G06F 40/279
See application file for complete search history.

(56) References Cited

U.S. PATENT DOCUMENTS

| | | |
|---|---|---|
| 8,942,512 B2 | 1/2015 | Chen et al. |
| 9,286,682 B1 | 3/2016 | Carr et al. |

(Continued)

*Primary Examiner* — Akwasi M Sarpong
*Assistant Examiner* — Michael L Burleson
(74) *Attorney, Agent, or Firm* — Finnegan, Henderson, Farabow, Garrett & Dunner, LLP (57) ABSTRACT

Keypoint extraction is done for extracting keypoints from images of documents. Based on different keypoint extraction approaches used by existing keypoint extraction mechanisms, number of keypoints extracted and related parameters vary. Disclosed herein is a method and system for keypoint extraction from images of one or more documents. In this method, a reference image and a test image of a document are collected as input. During the keypoint extraction, based on types of characters present in words extracted from the document images, a plurality of words are extracted. Further, all connected components in each of the extracted words are identified. Further, it is decided whether keypoints are to be searched in a first component or in a last component of all the identified connected components, and accordingly searches and extracts at least four of the keypoints from the test image and the corresponding four keypoints from the reference image.

8 Claims, 5 Drawing Sheets

(56) References Cited

U.S. PATENT DOCUMENTS

| | | |
|---|---|---|
| 2006/0050952 A1 | 3/2006 | Blais et al. |
| 2009/0150157 A1* | 6/2009 | Kagoshima ............. G10L 13/08 |
| | | 704/E13.011 |
| 2015/0276167 A1 | 10/2015 | Torabifard et al. |
| 2016/0292528 A1 | 10/2016 | Nakamura |
| 2019/0035061 A1* | 1/2019 | Ma ........................... G06T 5/70 |
| 2019/0325247 A1* | 10/2019 | Ordonez ................ G06V 30/15 |
| 2020/0084320 A1* | 3/2020 | Xiao .................... H04N 1/4092 |

* cited by examiner

1. MEMBER INFORMATION

POLICY NUMBER:

PET NAME:

NAME:

☐ UPDATE CONTACT INFO
ADDRESS:
CITY:
STATE: ZIP:
PHONE:
EMAIL:

No. of pages: _____

2. CLAIM DETAILS

REASON FOR VISIT, CHECK ALL THAT APPLY:
- WELLNESS SERVICES
- INJURY OR ILLNESS

WHAT INJURY OR ILLNESS DID YOUR VETERINARIAN DIAGNOSE?

TREATMENT DATE(S):
FROM:
TO:
HOSPITAL/CLINIC NAME:

3. INVOICE(S) TOTAL $

4. MEMBER SIGNATURE and DATE

X

5. SUBMIT CLAIM FORM and INVOICE(S)

FAX XXX-XXX-XXXX

——— OR ———

MAIL Nationwide Claims Department
PO Box 2344
Brea, CA 92822-2344

METHOD AND SYSTEM FOR KEYPOINT EXTRACTION FROM IMAGES OF DOCUMENTS

PRIORITY CLAIM

The present application is a U.S. National Stage Filing under 35 U.S.C. § 371 and claims priority from International Application No. PCT/IN20201050778 filed on Sep. 6, 2020, which application claims priority under 35 U.S.C. § 119 from India Application No. 201921035983, filed on Sep. 6, 2019. The entire contents of the aforementioned application are incorporated herein by reference.

TECHNICAL FIELD

This disclosure relates generally to image processing, and more particularly to extraction keypoints from image of documents.

BACKGROUND

In applications such as but not limited to document digitization, documents may have to be compared to each other. Consider an example of digitizing a filled forms collected from multiple candidates for a job interview. When a system is used to automate the process of digitizing the documents, the system would compare a captured image each of the filled forms with a corresponding standard template. By virtue of this comparison, the system identifies and differentiates between standard text in the documents and the data filled in by each of the candidates. However for this direct comparison to yield intended result, both the documents being compared are to be aligned properly to each other.

In order to address this problem, document alignment is performed, during which the documents being compared are aligned with respect to each other. Some of the state of art methods and systems involve use of centroids of words in the documents for homography estimation and for performing the alignment. This method however has been found to lack precision. Certain other state of art systems and methods use a keypoint based approach, and consider structures such as punctuation characters present in the documents as keypoints. Based on number of keypoints considered and the approach used for keypoint extraction, quality of the image matching and the corresponding results vary. Thus, right or optimal extraction/selection of the keypoints is crucial for accuracy of document alignment.

SUMMARY

Embodiments of the present disclosure present technological improvements as solutions to one or more of the above-mentioned technical problems recognized by the inventors in conventional systems. For example, in one embodiment, a processor implemented method for keypoint extraction is provided. In this method, a reference image and a test image of a document are collected, via one or more hardware processors, as input, wherein the reference image is an image of a document template and the test image is an image of a used version of the document template. Further, a keypoint extraction is performed from the test image and the reference image, via the one or more hardware processors. During the keypoint extraction, coordinates of bounding boxes for each of a plurality of words present in the reference image and the test image are determined by applying at least one Optical Character Recognition (OCR) technique on the reference image and the test image. The method further involves determining whether the plurality of words contain at least one character belonging to at least one of a plurality of pre-defined lists, based on at least one selection criteria, wherein each of the plurality of pre-defined lists comprises a plurality of characters characterized as having distinct tips at specific positions of character. Further, all words containing the at least one character belonging to at least one of a plurality of pre-defined lists are extracted, from the test image and the reference image, based on the at least one selection criteria. Further, all connected components in each of the extracted words are identified using an algorithm to find connected components. Further, it is determined whether keypoints are to be searched in a first component or in a last component of all the identified connected components, of each of the extracted words, based on the selection criteria. Then, at least four of the keypoints are extracted from the test image and the corresponding four keypoints from the reference image by searching in at least one of the first component or the last component.

In another aspect, a system for keypoint extraction is disclosed. The system includes one or more hardware processors; one or more communication interfaces; and one or more memory storing a plurality of instructions. The plurality of instructions when executed cause the one or more hardware processors to collect a reference image and a test image of a document, as input, wherein the reference image is an image of a document template and the test image is an image of a used version of the document template. The system then performs a keypoint extraction from the test image and the reference image. During the keypoint extraction, the system determines coordinates of bounding boxes for each of a plurality of words present in the reference image and the test image, by applying at least one Optical Character Recognition (OCR) technique on the reference image and the test image. The system then determines whether the plurality of words contain at least one character belonging to at least one of a plurality of pre-defined lists, based on at least one selection criteria, wherein each of the plurality of pre-defined lists comprises characters characterized as having distinct tips at specific positions of each of the characters. Further, all words containing the at least one character belonging to at least one of a plurality of pre-defined lists are extracted from the test image and the reference image, based on the at least one selection criteria. The system then identifies all connected components in each of the extracted words using an algorithm to find connected components. The system further determines whether keypoints are to be searched in a first component or in a last component of all the identified connected components, of each of the extracted words, based on the selection criteria, and then searches in at least one of the first component or the last component and then extracts at least four of the keypoints from the test image and the corresponding four keypoints from the reference image.

In yet another aspect, a non-transitory computer readable medium for keypoint extraction is provided. The non-transitory computer readable medium performs the following method for the keypoint extraction. In this method, a reference image and a test image of a document are collected, via one or more hardware processors, as input, wherein the reference image is an image of a document template and the test image is an image of a used version of the document template. Further, a keypoint extraction is performed from the test image and the reference image, via the one or more hardware processors. During the keypoint extraction, coordinates of bounding boxes for each of a plurality of words present in the reference image and the test image are determined by applying at least one Optical Character Recognition (OCR) technique on the reference image and the test image. The method further involves determining whether the plurality of words contain at least one character belonging to at least one of a plurality of pre-defined lists, based on at least one selection criteria, wherein each of the plurality of pre-defined lists comprises a plurality of characters characterized as having distinct tips at specific positions of character. Further, all words containing the at least one character belonging to at least one of a plurality of pre-defined lists are extracted, from the test image and the reference image, based on the at least one selection criteria. Further, all connected components in each of the extracted words are identified using an algorithm to find connected components. Further, it is determined whether keypoints are to be searched in a first component or in a last component of all the identified connected components, of each of the extracted words, based on the selection criteria. Then, at least four of the keypoints are extracted from the test image and the corresponding four keypoints from the reference image by searching in at least one of the first component or the last component.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1:
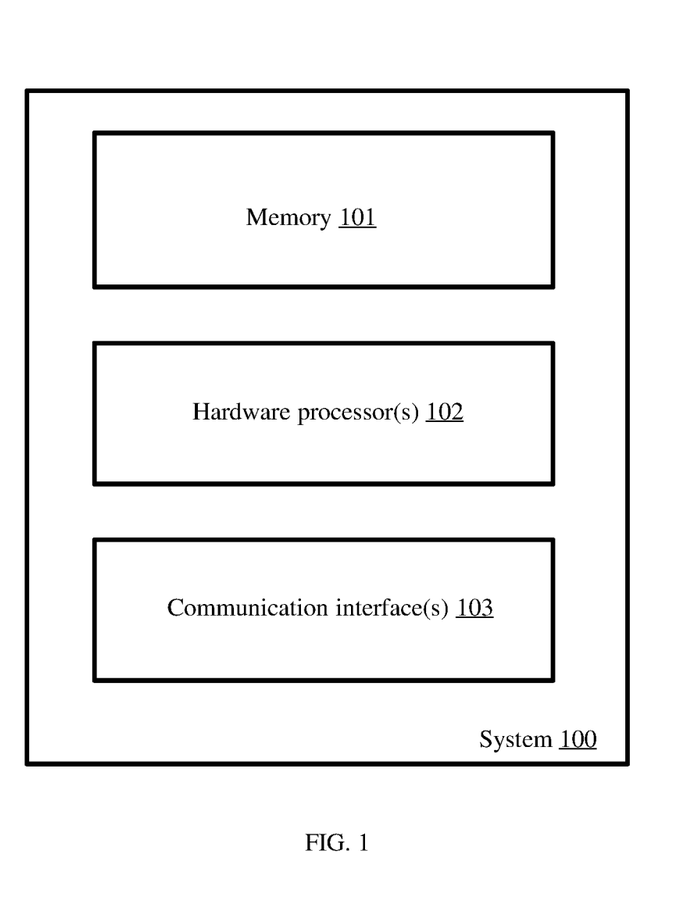
FIG. 1 illustrates an exemplary system for keypoint extraction from image of document, according to some embodiments of the present disclosure.

FIG. 1 illustrates an exemplary system for keypoint extraction from image of document, according to some embodiments of the present disclosure.

The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processors) are configured to fetch and execute computer-readable instructions stored in the memory. In an embodiment, the system 100 can be implemented in a variety of computing systems, such as laptop computers, notebooks, hand-held devices, workstations; mainframe computers, servers; a network cloud and the like.

The communication interface(s) 103 can include a variety of software and hardware interfaces, for example, a web interface, a graphical user interface, and the like and can facilitate multiple communications within a wide variety of networks NAN and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) 103 can be configured to provide appropriate communication interface/channel between different components of the system 100 to communicate each other. The communication interface(s) 103 can be further configured to provide appropriate communication interface/channel to facilitate communication between the system 100 and at least one external system. The communication interface(s) 103 can be configured to provide appropriate communication interface/channel for a user to interact with the system 100 to perform one or more authorized actions.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store operational instructions which when executed cause one or more of the hardware processor(s) 102 to perform various actions associated with the keypoint extraction and the document alignment and data extraction. In addition to the operational instructions, the memory 101 may store any other data associated with the keypoint extraction, temporarily or permanently, for processing or reference. For example, every time the keypoint extraction or the document alignment is performed by the system 100, the images of the one or more documents collected as input is stored in appropriate database in the memory 101. In another example, the memory 101 stores results and associated data of each of the keypoint extraction and/or alignment being performed, at least for a pre-defined time period. The various steps involved in the process of keypoint extraction and the document alignment and data extraction are explained with description of FIG. 2 and FIG. 3. All the steps in FIG. 2 and FIG. 3 are explained with reference to the system of FIG. 1.

Figure 2:
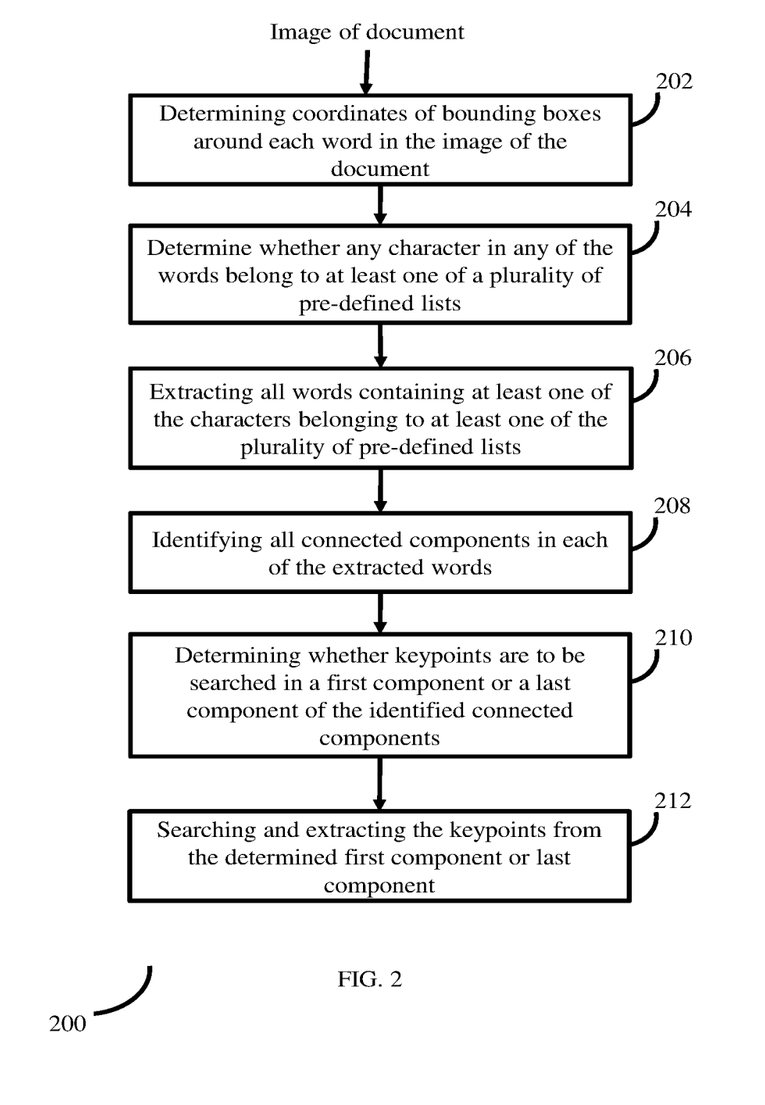
FIG. 2 is a flow diagram depicting steps involved in the process of performing the keypoint extraction from image of document, using the system of FIG. 1, according to some embodiments of the present disclosure.
Figure 3:
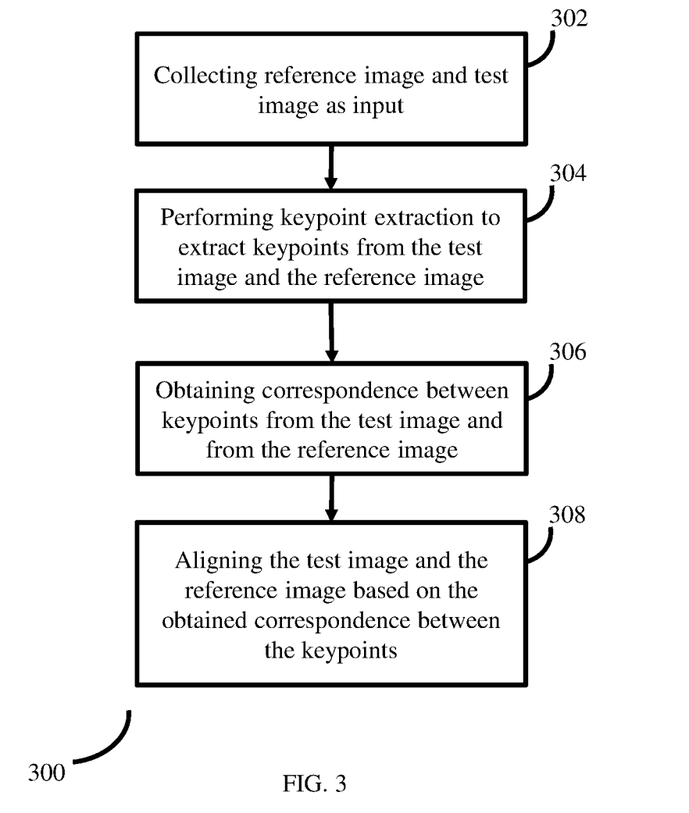
FIG. 3 is a flow diagram depicting steps involved in the process of performing a document alignment and data extraction using extracted keypoints, using the system of FIG. 1, according to some embodiments of the present disclosure.
Figure 4A:
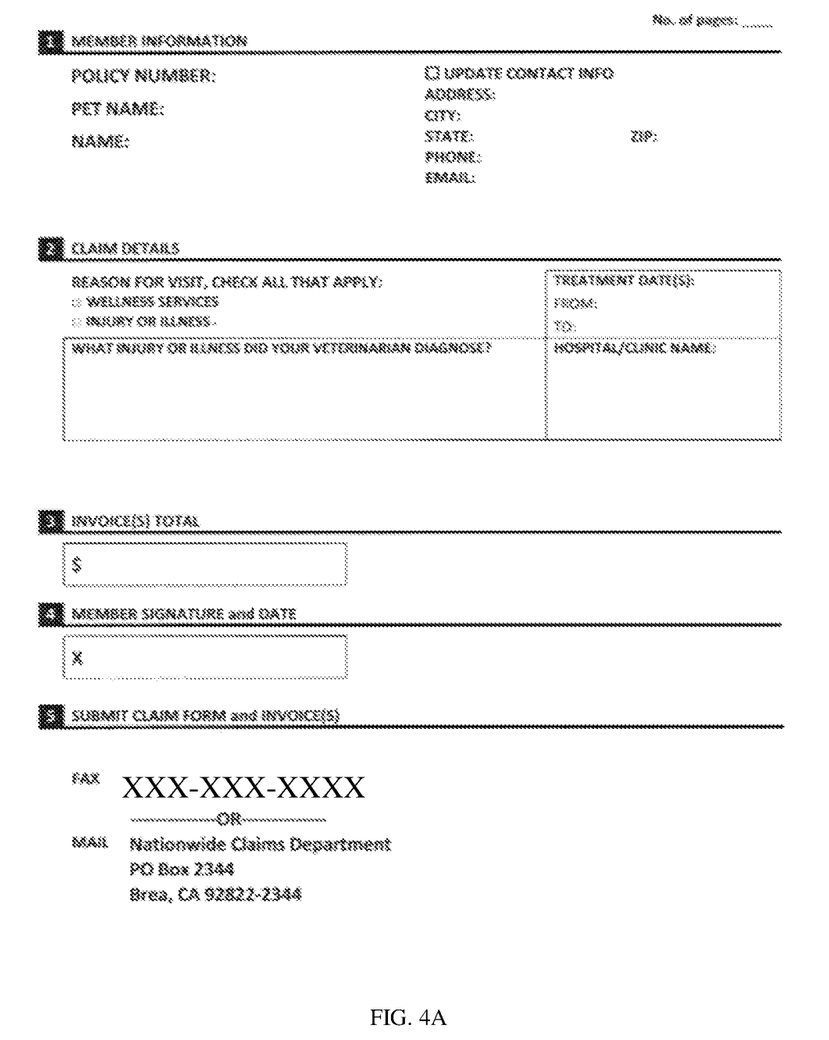
FIG. 4A and FIG. 4B are example diagrams depicting a document template and corresponding used version of the document template, according to some embodiments of the present disclosure.
Figure 4B:
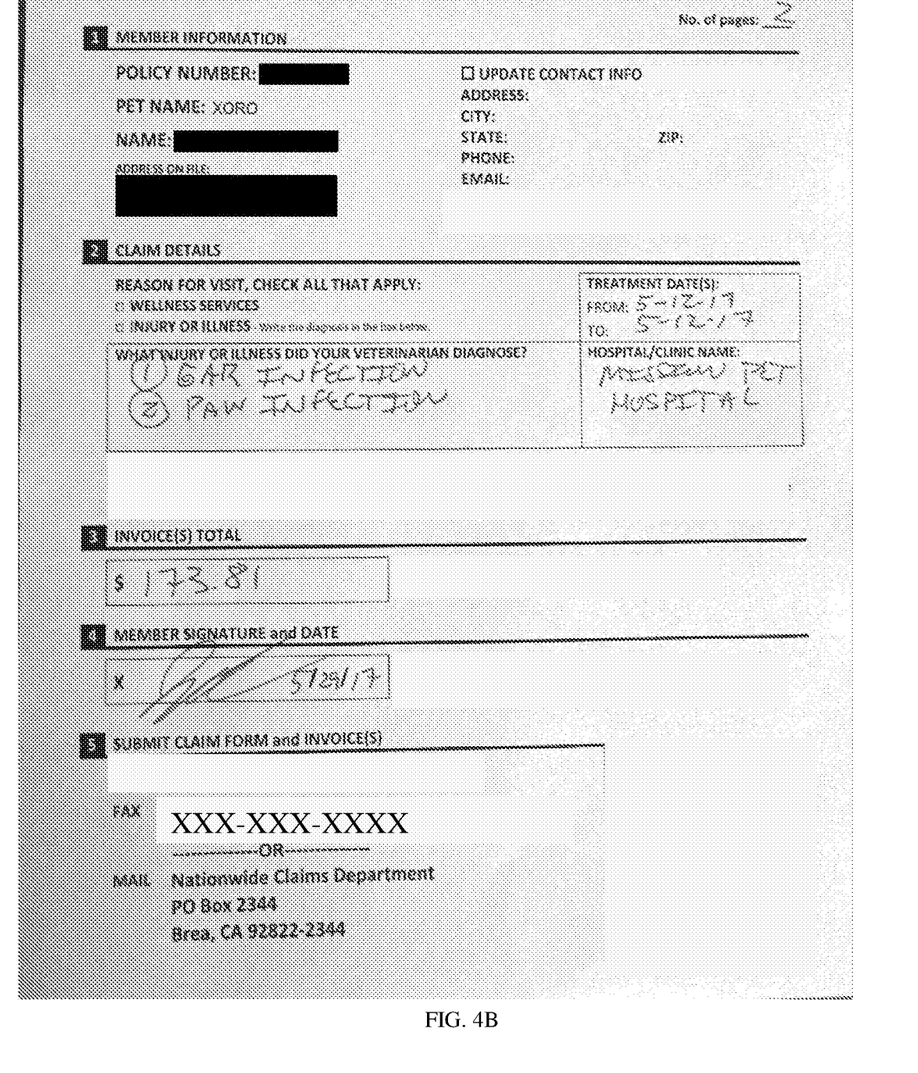

FIG. 2 is a flow diagram depicting steps involved in the process of performing the keypoint extraction, using the system of FIG. 1, according to some embodiments of the present disclosure. The one or more hardware processor(s) 102 of the system 100 collects at least one image of a document (alternately referred to as 'image') as input, for extracting the keypoints. The one or more hardware processor(s) 102 executes any suitable mechanism to identify all the words in the image of the document. For example, an Optical Character Recognition (OCR) algorithm/technique is used by the system 100 to identify words in the image. By running the OCR (or any other appropriate mechanism) technique, the system 100, using the one or more hardware processor(s) 102, also identifies (202) coordinates of bounding boxes corresponding to the identified words.

The system 100 then determines (204) using the one or more hardware processor(s) 102, whether any character in any of the identified words belong to at least one of a plurality of pre-defined lists (alternately referred to as 'Lists'), based on at least one selection criteria. In an embodiment, each of the plurality of pre-defined lists contain characters having distinct tips. For example, the pre-defined lists are begCharList, endCharList, topCharList, and bottomCharList and contain characters having distinct tips on left, right, top, and bottom respectively. For example, the begCharList comprises of characters such as 'A', 'V', 'T', 'Y', '4', 'v', 'w' and so on with a distinct left tip, and the endCharList comprises of characters like 'V', 'T', 'Y', '7', 'r' and so on with a distinct right tip. In the context of step 204, the selection criteria may indicate to the system 100 the list each of the characters belongs to.

From the identified words in the document, the one or more hardware processor(s) 102 then extracts (206) one or more words that satisfy a selection criteria. The selection criteria may be pre-defined or dynamically configured with the system 100, and may be stored in one or more databases in the memory 100. For example, in the context of the step 206, the selection criteria may specify that all words from the document that either begins with one of the characters that belong to begCharList, topCharList or bottomCharList, or ending with one of the characters belong to endCharList, topCharList, or bottomCharList are to be extracted.

For each word extracted at step 206, the one or more hardware processor(s) 102 further identifies (208) all the connected components. Connected components are a result of how the words are written in the document. For example, consider the word"cards". It is possible that in the word "cards" the letters/characters 'c' and 'a' are written very close to each other which would prompt the system to identify 'ca' as one connected component. In another embodiment, if the font size in which the words are written are smaller than certain pre-defined limit, the system 100 may still interpret the characters in the words are being close to each other and in turn may identify one or more connected components accordingly. Examples of some other parameters that may affect capability of the system 100 in determining the connected components are noise present in the image, resolution of the image and so on. In the similar way 'ds' also may be identified as another connected component, by the system 100, After identifying all the connected components in each of the extracted words, out of all the identified connected components, the system 100 selects the leftmost and the rightmost components for further processing. Further, based on the selection criteria, the system 100 determines (210) whether the keypoints are to be searched in the first component or the last component. For example, the selection criteria in the context of step 210 would specify that the keypoints are to be searched in the first component if the first character in the first component is in at least one of begCharList, topCharList or bottomCharList. The selection criteria in the context of step 210 may further specify that the keypoints are to be searched in the last component if the last character in the last component is in at least one of endCharList, topCharList or bottomCharList. Logic behind selection of only the first component and the last component omitting any other component that may be present in the word is that the first component and the last component are guaranteed to contain a first character and a last character of the word respectively.

The system 100 then searches in the first component or the last component, as determined at step 210, and extracts (212) all the keypoints. The keypoints extracted at step 212 by the system 100 may be further used for various applications. FIG. 3 depicts an example embodiment of use of the extracted points for document alignment and data extraction.

In various embodiments, certain heuristic checks are done by the system 100 to improve results of the keypoint detection and extraction being performed. One of the checks is to ensure that words with two or less than two characters are not considered for keypoint search and extraction, as they are likely to increase false positives in the keypoint search and extraction. Another constraint is put in the form of a minimum font size requirement, as very small fonts tend to get broken during processing. The system 100 may also use a dictionary to make sure that the words being processed for keypoint extraction are correct (and valid) in terms of spelling.

In various embodiments, steps in the method 200 may be performed in the same order as depicted in FIG. 2 or in any alternate order that is technically feasible. In another embodiment, one or more steps in the method 200 may be omitted.

FIG. 3 is a flow diagram depicting steps involved in the process of performing a document alignment and data extraction using extracted keypoints, using the system of FIG. 1, according to some embodiments of the present disclosure.

Document alignment refers to a process of aligning two or more documents with respect to each other. Consider a scenario in which an official form is distributed among a plurality of candidates, each of the candidates fills the form and resubmits. If the system 100 is to be used to automatically digitize the forms from the candidates, the system 100 needs to identify and extract contents filled by each of the candidates. An original template of the form would contain certain standard information, and the data filled in by each candidate is additional information. To identify and extract this 'additional information' and map with corresponding user, the system 100 compares a reference image (image of a document template of the form being filled by the candidates) and a test image (image of a used version of the document template as submitted by each of the candidates). This process is elaborated below:

The system 100 collects (302) the reference image and the test image as inputs and then performs (304) the keypoint extraction as explained in description of FIG. 2 to extract keypoints separately from the test image as well as from the reference image.

The system 100 then obtains (306) correspondence between the keypoints from the test image and the reference image, by performing a keypoint matching. In some scenarios, one or more words may repeat in the document template as well as in the used version of the document template. To perform the document alignment, each word in the used version of the document is to be compared with corresponding word in the document template. To improve accuracy of the word matching, the system 100 may consider a neighborhood information corresponding to each of the words. In an ideal scenario, all the words in the neighborhood region of a word in the reference image (i.e. the document template) should also occur in the corresponding test image as well. As the used version of the document template (as in the test image) may have some additional data in comparison with the document template in the reference image, certain threshold for a percentage match between the neighborhood of words in the test image and the reference image are also defined. For example, a 90% threshold is defined which means that if a test candidate neighborhood has at least 90% of the words present in the template word neighborhood, then the test candidate (i.e. a word from the test image) is the corresponding matching word in the test document.

Further, based on an obtained correspondence between the test image and the reference image, documents corresponding to the test image and the reference image are aligned (308) with respect to each other. Any suitable method/technique can be used for aligning the documents. After the documents are aligned, then by performing direct comparison between the documents, changes (i.e. data filled in by each of the candidates) can be identified. In various embodiments, steps in the method 300 may be performed in the same order as depicted in FIG. 3 or in any alternate order that is technically feasible. In another embodiment, one or more steps in the method 300 may be omitted.

It is to be noted that the keypoints extracted using the method 200 can be used for other suitable applications as well.

Dataset and Experimental Results

Two datasets were considered for experimental purpose: a first dataset consisting 15 insurance claim forms and one corresponding empty document template/form, and a second dataset containing 15 life insurance application forms along with one corresponding empty template form. This dataset did not have filled text in printed form. The filled data was only in the form of handwritten text. These datasets contain documents with variations in illumination, different backgrounds like wooden table, and also the documents are affine transformed relative to the document template. AH the documents were resized to 1600*2400, and converted to grayscale for further experiments.

During the experiment, an empirically decided threshold of 170 was used for binarization of the documents. Alignment was followed by text field retrieval and classification of the text into printed or handwritten. A 5-layer Convolutional Neural Network (CNN) was trained on patches of printed text cropped from detected text, and patches of the handwritten text. A test accuracy of 98.5% was obtained when the CNN was tested on fields extracted from the documents. A quantitative measure of the information extraction pipeline is the character recognition accuracy of the retrieved text fields. Different models are employed for handwritten and printed text. Table I shows the accuracies of some of the fields of interest in the first insurance dataset. To get an estimate of the amount of perturbations that the system 100 can handle, the system 100 made use of the second insurance dataset and performed varying degrees of transformations such as but not limited to rotation, translation, and scaling. It was further observed that the system 100 is able to handle translations and scaling of the test documents. For rotations, the system performance is unaffected for rotations upto ±7° in an x-y plane of the image. Horizontal and vertical translations range in between ±40% of the document width and height respectively. Scaling factors largely depend on the font size on the document and the system performance is not impacted until the image gets pixelated. For the datasets used/considered, scaling works perfectly when the width and height are varied from 50% to 200% of their original values.

TABLE 1

| Field | HTR Model | Google Vision API |
| --- | --- | --- |
| Agency Name | 78.7% | 83.5% |
| Agency Address | 78.3% | 84.6% |
| First Name | 80.1% | 84.5% |
| Last Name | 80.7% | 86.7% |
| Applicant Address | 78.4% | 82.6% |
| City | 81.9% | 93.5% |
| State | 83.2% | 89.6% |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive luting of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for keypoint extraction, comprising:
    collecting, via one or more hardware processors, a reference image and a test image of a document, as input, wherein the reference image is an image of a document template and the test image is an image of a used version of the document template; and performing a keypoint extraction from the test image and the reference image, via the one or more hardware processors, comprising:
  determining coordinates of bounding boxes for each of a plurality of words present in the reference image and the test image, by applying at least one Optical Character Recognition (OCR) technique on the reference image and the test image;
  determining whether the plurality of words contain at least one character belonging to at least one of a plurality of pre-defined lists, based on at least one selection criteria, wherein each of the plurality of pre-defined lists comprises a plurality of characters characterized as having distinct tips at specific positions of character, wherein the plurality of pre-defined lists comprise a begCharList, an endCharList, a topCharList, and a bottom CharList;
  extracting all words containing the at least one character belonging to at least one of a plurality of pre-defined lists, from the test image and the reference image, based on the at least one selection criteria;
  identifying all connected components in each of the extracted words using an algorithm to find connected components;
  determining whether keypoints are to be searched in a first component or in a last component of all the identified connected components, of each of the extracted words, based on the at least one selection criteria; and
  searching in at least one of the first component or the last component and extracting at least four of the keypoints from the test image and corresponding at least four keypoints from the reference image.

2. The method of claim 1, wherein the extracted one or more keypoints are used for document alignment and data extraction, comprising:
  obtaining correspondence between keypoints from the test image and the keypoints from the reference image, by performing a keypoint matching;
  aligning the test image and the reference image based on the obtained correspondence between the keypoints from the test image and the reference image, wherein by aligning the test image and the reference image, the document template and the used version of the document template are aligned; and
  extracting data from the used version of the document template as in the test image.

3. The method of claim 1, wherein the at least one selection criteria comprises extraction of words beginning with one of the characters present in at least one of the begCharList, the topCharList, and the bottom CharList.

4. The method of claim 1, wherein the at least one selection criteria comprises extraction of words ending with one of the characters present in at least one of the endCharList, the topCharList, and the bottomCharList.

5. A system for keypoint extraction, comprising:
  one or more hardware processors;
  one or more communication interfaces; and
  one or more memory storing a plurality of instructions, wherein the plurality of instructions when executed cause the one or more hardware processors to:
    collect a reference image and a test image of a document, as input, wherein the reference image is an image of a document template and the test image is an image of a used version of the document template; and
    perform a keypoint extraction from the test image and the reference image, comprising:
      determining coordinates of bounding boxes for each of a plurality of words present in the reference image and the test image, by applying at least one Optical Character Recognition (OCR) technique on the reference image and the test image;
      determining whether the plurality of words contain at least one character belonging to at least one of a plurality of pre-defined lists, based on at least one selection criteria, wherein each of the plurality of pre-defined lists comprises characters characterized as having distinct tips at specific positions of each of the characters, wherein the plurality of pre-defined lists comprise a begCharList, an endCharList, a topCharList, and a bottom CharList;
      extracting all words containing the at least one character belonging to at least one of a plurality of pre-defined lists, from the test image and the reference image, based on the at least one selection criteria;
      identifying all connected components in each of the extracted words using an algorithm to find connected components;
      determining whether keypoints are to be searched in a first component or in a last component of all the identified connected components, of each of the extracted words, based on the at least one selection criteria; and
      searching in at least one of the first component or the last component and extracting at least four of the keypoints from the test image and corresponding at least four keypoints from the reference image.

6. The system of claim 5, wherein the system performs document alignment and data extraction using the extracted one or more keypoints, by:
  obtaining correspondence between keypoints from the test image and the keypoints from the reference image, by performing a keypoint matching;
  aligning the test image and the reference image based on the obtained correspondence between the keypoints from the test image and the reference image, wherein by aligning the test image and the reference image, the document template and the used version of the document template are aligned; and
  extracting data from the used version of the document template as in the test image.

7. The system of claim 5, wherein the at least one selection criteria comprise extraction of words beginning with one of the characters present in at least one of the begCharList, the topCharList, and the bottomCharList.

8. The system of claim 5, wherein the at least one selection criteria comprise extraction of words ending with one of the characters present in at least one of the endCharList, the topCharList, and the bottomCharList.

* * * * *